Jan. 7, 1941. M. KNOBEL 2,227,858
TIMING OF OSCILLATING SYSTEMS
Filed March 22, 1939 2 Sheets-Sheet 1
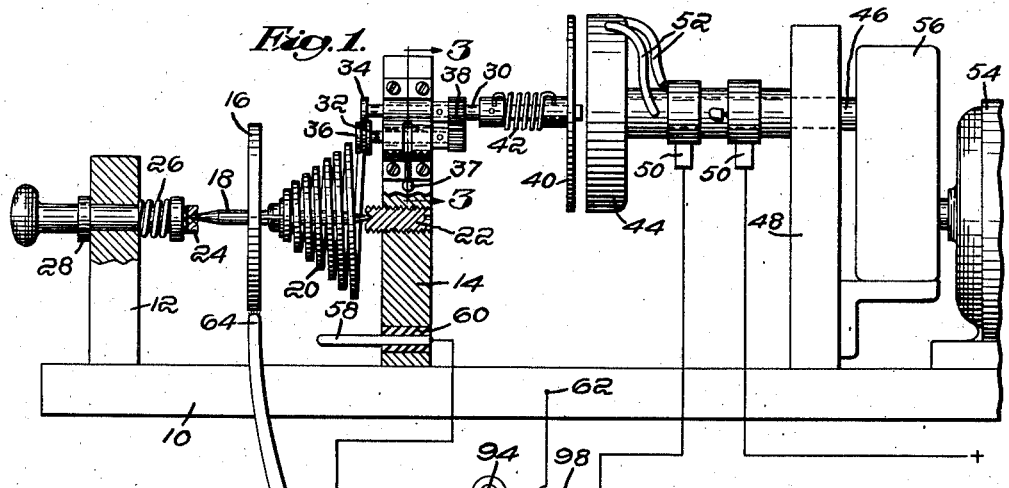
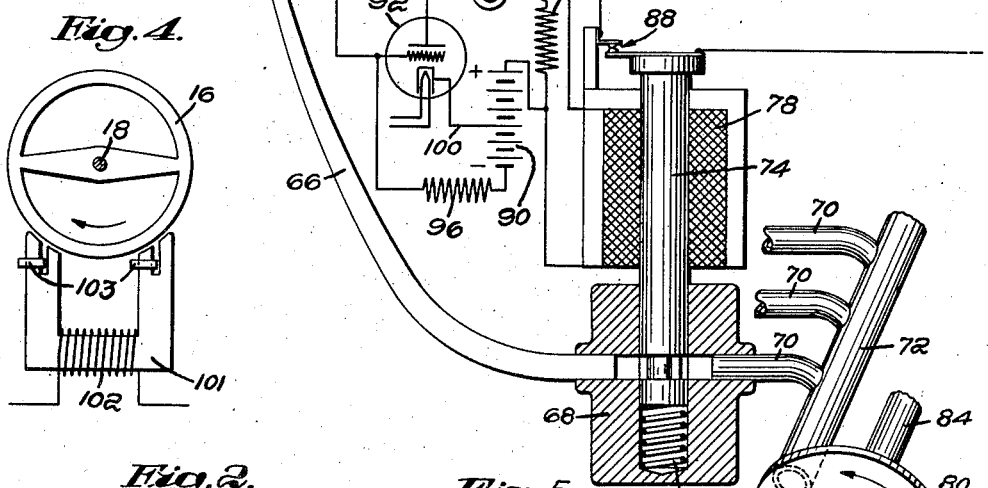
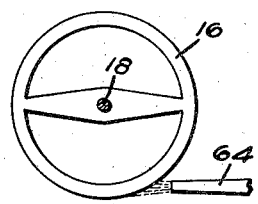
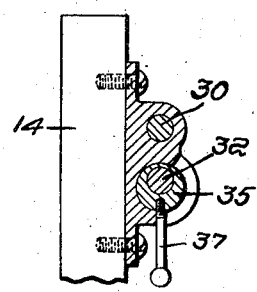
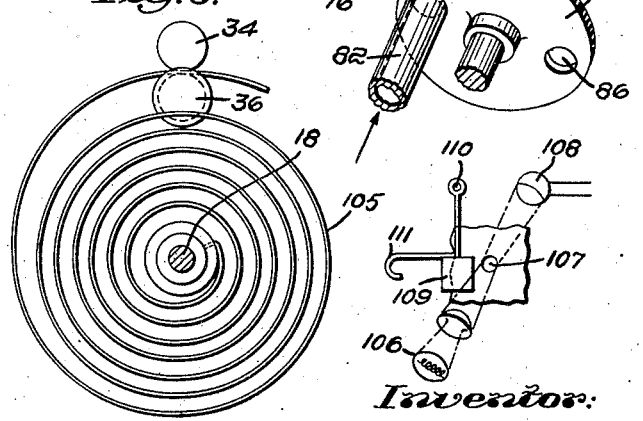
Inventor:
Max Knobel,
by Kenway & Witter
Attorneys Jan. 7, 1941.  M. KNOBEL  2,227,858
TIMING OF OSCILLATING SYSTEMS
Filed March 22, 1939    2 Sheets-Sheet 2
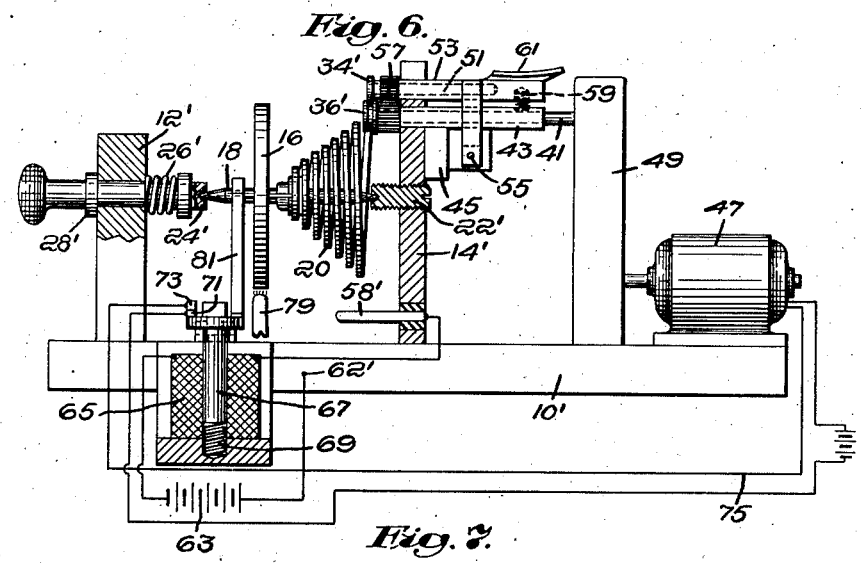
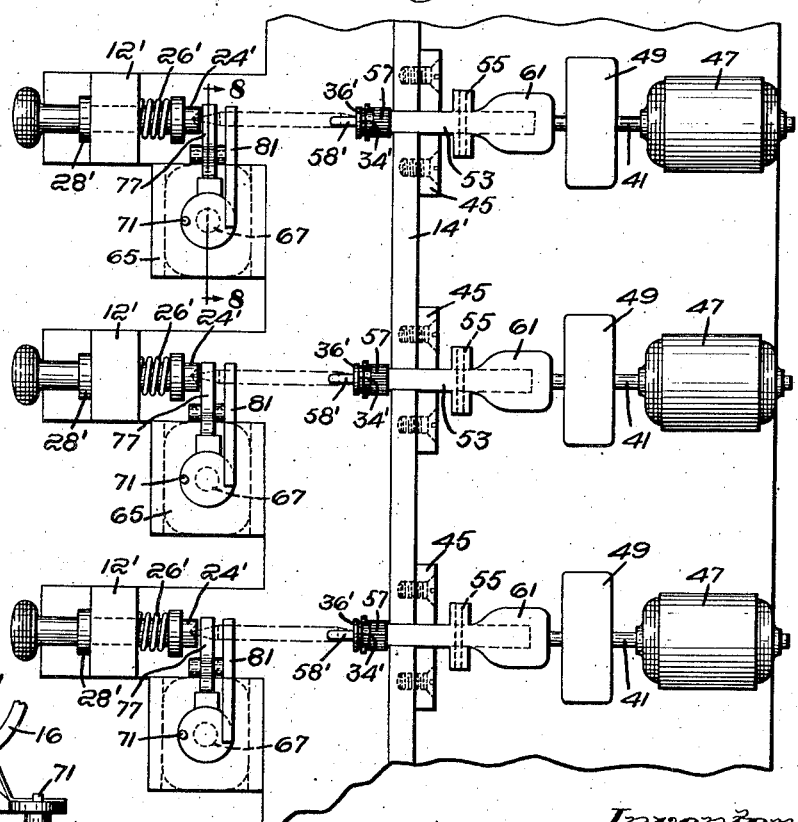
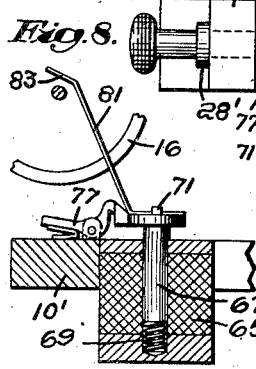
Inventor:
Max Knobel,
by Kenway & Witter
Attorneys Patented Jan. 7, 1941

2,227,858

UNITED STATES PATENT OFFICE 2,227,858

TIMING OF OSCILLATING SYSTEMS

Max Knobel, Arlington, Mass.

Application March 22, 1939, Serial No. 263,466

5 Claims. (Cl. 73—51)

This invention relates to the timing of oscillating systems used in chronological instruments, such a system for clocks and watches ordinarily embodying a balance wheel on a staff having the inner end of a hair spring attached thereto. The value of such instruments resides in their time-keeping accuracy and such accuracy depends primarily on the timing accuracy of the oscillating system employed. The frequency of oscillation depends upon such factors as the construction and weight of the parts comprising the system, and the natural frequency of oscillation can be increased or diminished respectively by decreasing or increasing the length of the hair spring employed. Each instrument is constructed to operate at a definite frequency and such frequency is originally established in each instrument by giving the hair spring an effective length which will cause the oscillating system to beat at the desired predetermined frequency. The accomplishing of this function requires the individual timing of each oscillating system before the system is installed in the instrument and this timing is commonly effected by oscillating the system together with a master system and changing the length of the hair spring at its outer end until the new system oscillates substantially in synchronism with the master system. The timing comparison and other operations required have been heretofore carried out manually thereby not only requiring the services of many skilled employees but, furthermore and of greater importance, involving the human element and the inaccuracies and failures resulting therefrom. The primary object of my invention is the production of a novel method and apparatus for performing this timing of oscillating systems automatically thereby eliminating both the human element and the necessity for skilled operators.

My invention operates on the principle that an oscillating system will function at its greatest amplitude when oscillating at its natural frequency and on the fact that, when such frequency is in harmonic relationship with the frequency of rotating impulses directed onto the system, the oscillations of the system will build up to a relatively great amplitude. Employing this knowledge to effect the object of the invention, I mount the system for free rotation and direct thereonto relatively light rotating impulses at a predetermined frequency corresponding in harmonic relationship to the natural frequency to which it is desired to tune the system. The outer end of the hair spring is gripped, as between a pair of rotary rolls, and the gripping position is slowly and progressively moved longitudinally along the spring in a direction to cause the natural frequency of the oscillating system to approach the said predetermined frequency. As the impulses and gripping movement are continued, the combined effects of the spring and impulses build up a relatively large amplitude of oscillation which is greatest when the natural frequency of the system is in harmonic relationship with that of the impulses. At this point, the outer convolution of the hair spring moves outwardly to a maximum position, and I utilize this action to determine when the desired effective length of the spring has been reached. The gripping movement, as well as the impulses, are preferably stopped automatically at this point and the spring is marked in any desired manner to indicate the position thereon at which its outer end is to be anchored, and the oscillating system is then ready to be installed in the instrument for use.

These and other features of the invention will be best understood and appreciated from the following description of preferred embodiments thereof selected for purposes of illustration and shown in the accompanying drawings wherein—

Fig. 1 is a combined elevation and diagrammatic view illustrating one form of my invention., Fig. 2 is a fragmentary end elevation of the balance wheel and the cooperating impulse nozzle, Fig. 3 is a fragmentary view taken on line 3—3 of Fig. 1, Fig. 4 is a fragmentary view showing another method of imparting impulses to the oscillating system, Fig. 5 is an enlarged view of the hair spring in end elevation and an electric eye control cooperating therewith, Fig. 6 is a view similar to Fig. 1 and showing a modified form of the invention, Fig. 7 is a fragmentary plan view of a battery of timing units constructed in accordance with Fig. 6, and Fig. 8 is a fragmentary detail view taken on line 8—8 of Fig. 7.

Referring first to Fig. 1 of the drawings wherein I have illustrated one form of apparatus for carrying my invention into practice, 10 indicates a base carrying two uprights 12 and 14 on which the oscillating system to be tuned or timed is mounted. This system embodies a balance wheel 16 on a staff 18 having the inner end of a hair spring 20 attached thereto. The upright 14 is provided with a fixed stud 22 for receiving one end of the staff and the upright 12 is provided with a stud 24 for receiving the other end thereof. A spring 26 normally holds the stud 24 in the position illustrated wherein a stop 28 thereon engages against the upright 12 and holds the stud 24 in proper position for cooperating with the stud 22 to support the staff for free rotation.

Supported on the upright 14 are two shafts 30 and 32 carrying two cooperating rolls 34 and 36 at their free ends, the shafts being geared together at 38. The shaft 30 carries the disk 40 of an electro-magnetic clutch on its other end, a spring 42 normally holding the clutch withdrawn from the magnetic driving element 44 as illustrated. The element 44 is carried on the inner end of a shaft 46 supported on an upright 48 on the base, and brushes 50 and cables 52 provide for conducting electric current to the clutch. This shaft 46 is driven at very slow speed from a motor 54 through reduction gearing at 56.

The outer end of the hair spring 20 is gripped between the rolls 34 and 36 and mounted on the upright 14 in position to cooperate with the outer convolution of the hair spring when in its maximum expanded position is a contact pin 58 insulated from the base by a bushing 60. The contact pin forms one terminal of an electric circuit having its other terminal grounded to the base at 62 and embodying mechanism for releasing the clutch disk 40 when the hair spring expands to a position making contact with the pin 58, all as hereinafter described.

Cooperating with the balance wheel 16 is the nozzle 64 of an air conduit 66, the nozzle being directed tangentially of the balance wheel whereby air projected therefrom will tend to rotate the wheel. The conduit 66 extends into a member 68 and cooperates with a conduit 70 in communication with a main conduit 72 arranged to serve a plurality of conduits 70. A valve 74 in the member 68 between the conduits 66 and 70 is normally held in the open position of Fig. 1 by a spring 76, the valve stem passing upwardly through an electro-magnetic coil 78 adapted to draw the valve down to closed position when the coil is energized.

Cooperating with the main conduit 72 and in direct and open alignment therewith but with a disk 80 therebetween is an air conduit 82. The disk is mounted on a shaft 84 and is provided with a hole 86 therethrough arranged to coincide with the conduits 72 and 82 once for each rotation of the disk. The purpose of this construction is to direct relatively light rotating air puff impulses onto the balance wheel, the disk 80 being rotated at such speed as will provide these puffs at a frequency corresponding in harmonic relationship to the frequency at which it is desired to tune or time the oscillating system.

The electric circuit to the brushes 50 is arranged to pass through a switch 88 which is normally closed as illustrated in Fig. 1 but which is opened when the coil 78 is energized and the valve 74 drawn downwardly. The electric circuit from the terminals 58 and 62 embodies a battery 90, a thyratron tube 92, a normally closed push button switch at 94 in a cooperating circuit and which may be opened by pressing the switch button, and two resistances at 96 and 98. The circuit from the grid of the tube through the resistance 96 back to the filament of the tube at 100 places a negative bias on the tube which prevents it from conducting. However, when the hair spring 20 expands sufficiently to make a contact at 58, the tube immediately becomes conductive due to the positive charge conducted to the grid of the tube through resistor 98, contact 62, etc., and current therethrough from the battery energizes the coil 78 whereby moving the valve 74 downwardly to the closed position, this movement closing the conduits 66—70 and opening the circuit to the electro-magnetic clutch 44.

The operation of the apparatus is substantially as follows: One apparatus will ordinarily comprise a battery of several timing units, the motor 54 and gearing 56 being adapted to drive all the clutch elements 44 of the units and the main air conduit 72 being arranged to serve all the units through the several conduits 70. The motor and reduction gearing are constructed to drive the clutch elements at a very slow speed, probably never exceeding one rotation per minute. The shaft 84 and disk 80 are rotated at a speed to give to the balance wheel the number of impulses per minute, or a sub-multiple thereof, to which the oscillating systems are to be timed, this commonly being 120 per minute. If the disk is rotated at 120 turns per minute, 120 puffs of air are directed from the conduit 82 into the conduit 72 and are conducted through the conduits 70 and 66 when the valves 74 are open. If a sub-multiple number of puffs per minute are employed, i. e. 60, 40, 30, etc., these puffs will be delivered in like manner and in like harmonic relationship, the effect being simply that certain of the 120 puffs are eliminated.

One operator serves all the units of a battery in sequence. At each unit he withdraws the stud 24 and places the oscillating system to be timed in the position illustrated in Fig. 1. He then places the outer end of the hair spring 20 between the rolls 34 and 36, it being noted that the lower roll 36 can be drawn away from the roll 34 by rotating the eccentric bushing 35 by means of a handle 37 carried by the bushing. During this period the tube 92 is conducting a current through the coil 78 whereby holding the switch 88 open and the valve 74 closed. When the oscillating system is thus placed, the operator presses the switch button 94 whereby momentarily breaking the positive circuit through the tube and causing the negative bias to become effective and the tube rendered non-conductive. The spring 76 thereupon immediately raises the valve 74 to the position of Fig. 1 whereupon communication is established between conduits 66 and 70 and the switch 88 is closed. The tube remains non-conductive until its grid circuit is again established by closing the circuit including the contact 58.

The clutch 40—44 is thereupon immediately closed and the air impulses are conducted from the conduit 72 to the balance wheel. These impulses are so relatively light as to be unable of themselves to drive the system to any appreciable amplitude but when operated in harmonic relationship with the hair spring they act as a booster to drive the system through a relatively large amplitude. The length of the hair spring as originally engaged with the rolls 34—36 is such that the natural frequency of oscillation of the system is less than 120 per minute. As the rolls travel along and shorten the effective length of the spring, the natural frequency thereof gradually increases and approaches the desired frequency of 120 per minute and during this period the oscillating amplitude of the system gradually increases and the outer convolution of the spring approaches the pin 58. This pin is so located that the spring will contact it substantially when the natural frequency of oscillation of the system is in harmonic relationship with the frequency of the impulse booster. When such contact takes place the rolls and impulses are automatically stopped, as above pointed out, and the unit remains idle. When the operator reaches this unit, he marks the outer end of the spring, as by bending it about one of the rolls, to indicate the position thereon at which its outer end is to be anchored. He then removes the timed system and places another to be timed in its place. He then presses the button 94 and the above described operating cycle is repeated.

It will be understood that my invention is adaptable to many modifications. For example, in Fig. 4 I have illustrated means for giving electro-magnetic impulses to the balance wheel. This means as illustrated is substantially in the nature of an induction motor and comprises a two-pole electro-magnet 101 provided with a coil 102. To copper shading rings 103 are mounted on the outer portions of the two poles. Electrical impulses at the frequency of 120 per minute, or a sub-multiple thereof, are sent through the coil which thereupon reacts through the poles to give relatively light rotating impulses to the balance wheel in the direction indicated by the arrow.

In Fig. 5 I have illustrated means including an electric eye cooperating with the outer convolution 105 of the hair spring for automatically terminating the timing action when the desired natural timing frequency of the system is reached. This means includes a lamp 106 arranged to project a light beam through an aperture 107 and onto the light sensitive cell 108. A screen 109 is mounted to pivot at 110 and is provided with a finger 111 for engagement by the spring convolution 105. When the spring expands to a position forcing the screen across the aperture the light beam is cut off and the timing action terminated, it being understood that any suitable means may be provided to effect the terminating or controlling operation from the cell.

In Figs. 6-8, I have illustrated a somewhat modified form of the invention. The oscillating system to be timed is the same as that already described and the parts of this apparatus which are the same as corresponding parts shown in Fig. 1 are indicated by like reference characters primed. The lower roll 36' is mounted on one end of a shaft 41 supported in a bearing 43 carried by a bracket 45 secured to the upright 14', this shaft being driven very slowly from a motor 47 through reduction gearing at 49. The roll 34' is mounted on a shaft 51 carried in a bearing 53 pivoted at 55 to an outwardly projecting portion of the bracket 45. The shafts are geared together at 57 and a spring 59 normally holds the gears and rolls in cooperating engagement, manual pressure on a plate 61 being adapted to raise the roll 34' from the roll 36' to a position permitting the insertion and removal of the hair spring 20.

An electric circuit cooperating with the apparatus has one terminal grounded to the base 10' at 62' and its other terminal is connected to the contact pin 58'. This circuit includes a battery 63 and a coil 65 within which is a core 67. A spring 69 normally holds the core in the raised position of Fig. 6 in which position one switch element 71 carried thereby is in contact with a fixed element 73 of the switch. This switch is in the circuit 75 of the motor 47. A spring pressed latch 77 is also arranged to engage and hold the core 67 in its down position when drawn to that position by the energizing of the coil.

Relatively light rotating impulses at a frequency corresponding in harmonic relationship to the frequency at which it is desired to tune or time the oscillating system are given to the oscillating system continuously, as by means of an air jet at 79 directed onto the balance wheel. It will be apparent that the motor 47 and rolls 34' and 36' are operated when the core 67 is in the raised position. Also when the core is in this position, a resilient finger 81 carried thereby is so elevated that its free end 83 is raised free from engagement with the oscillating system, the finger being arranged however to frictionally engage the system when the core is drawn down to its latched position.

The operation of this apparatus is substantially as follows: Considering that the oscillating system 16—20 shown in Fig. 6 has just been placed in the unit and the latch 77 has just been released, the motor rotates the rolls 34' and 36' very slowly in the spring shortening direction while the jet 79 continually directs air impulses onto the system. As the spring is being shortened and the natural frequency of oscillation of the system is increasing, the oscillating amplitude gradually builds up until the outer convolution of the spring makes contact with the pin 58', it being understood that at such time the effective length of the spring is such that the natural frequency of the oscillating system is in harmonic relationship with the impulse frequency directed onto the system and is substantially the natural frequency desired. Such contact with the pin 58' causes energizing of the coil 65 whereupon the core 67 is drawn down to a position disengaging the motor contacts 71—73 and engaging the finger 83 frictionally against the staff 18, the core being automatically latched in this down position at 77. Thus the rolls are stopped and the frictional engagement at 83 is sufficient to stop and hold the oscillating system against further movement. When the operator reaches this unit, he marks the outer gripped position of the spring and then releases the spring by depressing the plate 61. The timed system is then removed and a new system to be timed is substituted therefor. The timing operation or cycle is then restarted by releasing the latch 77.

It is believed that the purpose, operation and utility of my invention will now be understood and appreciated, and it will also be very apparent that the invention is adaptable to very numerous modifications. The specific disclosures herein made, which provide means for automatically stopping the spring gripping movement on and along the outer end of the hair spring when the system has reached a predeterminedly large amplitude and after which the operator marks the gripping position on the spring and removes the timed system, are belived to be the most practicable. The important result to be accomplished, however, is the determining and marking of the proper anchoring position on the outer end of the hair spring and, while the marking of this position manually in the manner described is believed to be most practicable, it is apparent nevertheless that the spring gripping movement and the timing action can be terminated by marking this position automatically even though the feeding rolls are not stopped at this time but are allowed to overrun or are separated sufficiently to stop their gripping and feeding action on the hair spring. It will also be apparent that impulses may be applied to the oscillating systems in any suitable manner as, for example, by oscillating the gripped outer end of the hair spring in a period to effect the desired impulse action.

Having thus described my invention what I claim as new and desire to secure by Letters Patent of the United States is:

1. An apparatus for timing an oscillating system embodying a balance wheel on a staff having the inner end of a hair spring attached thereto, comprising means for rotatably supporting the system, means for imparting relatively light rotating impulses at a predetermined frequency to the system, means for gripping the outer end portion of the spring and slowly and progressively moving the gripping position longitudinally of the spring whereby changing its effective length in a direction to cause the natural frequency of the oscillating system to approach harmonic relationship with the said predetermined frequency, and means cooperating with a convolution of the spring for stopping said movement of the spring gripping position when the oscillating amplitude of the system becomes sufficiently large to move said convolution outwardly to a predetermined position.

2. The apparatus defined in claim 1 in which the last named means includes an electric circuit and a switch contact therein arranged to cooperate with said convolution of the spring to close the circuit and terminate the timing action when the oscillating amplitude of the system becomes sufficiently large to move said convolution outwardly to a predetermined position.

3. The apparatus defined in claim 1 in which the last named means includes an electric circuit and a switch contact therein arranged to cooperate with said convolution of the spring to close the circuit when the oscillating amplitude of the system becomes sufficiently large to move said convolution outwardly to a predetermined position, an electro-magnet associated with said circuit and energized by the closing of said circuit, an armature cooperating with the magnet, and means, including an electric switch arranged to be opened by said armature when the magnet is energized, for terminating the timing action.

4. The apparatus defined in claim 1 plus means for placing a frictional load on the system when the oscillating amplitude of the system becomes sufficiently large to move said convolution outwardly to said predetermined position.

5. The apparatus defined in claim 1 in which the last named means includes an electric circuit and a switch contact therein arranged to cooperate with said convolution of the spring to close the circuit when the oscillating amplitude of the system becomes sufficiently large to move said convolution outwardly to a predetermined position, and a thyratron tube associated with said circuit and rendered conductive by the closing of said circuit, a battery and a normally closed switch associated with said tube, opening of the normally closed switch being adapted to render the tube non-conductive and closing of said switch being adapted to render the tube conductive upon the closing of said circuit, said tube when conductive terminating the timing action.

MAX KNOBEL.